(12) United States Patent (10) Patent No.: US 12,677,284 B2
Li et al. (45) Date of Patent: Jul. 7, 2026

(54) UPLINK TRANSMISSION METHOD AND APPARATUS, UPLINK RECEIVING METHOD AND APPARATUS, DEVICE, AND STORAGE MEDIUM

(71) Applicant: VIVO MOBILE COMMUNICATION CO., LTD., Guangdong (CN)

(72) Inventors: Na Li, Guangdong (CN); Xiaohang Chen, Guangdong (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 607 days.

(21) Appl. No.: 18/094,039

(22) Filed: Jan. 6, 2023

(65) Prior Publication Data

US 2023/0156711 A1 May 18, 2023

Related U.S. Application Data

(63) Continuation of application No. PCT/CN2021/106434, filed on Jul. 15, 2021.

(30) Foreign Application Priority Data

Jul. 15, 2020 (CN) .......................... 202010683119.9

(51) Int. Cl.
H04W 72/21 (2023.01)
H04W 72/1268 (2023.01)
(52) U.S. Cl.
CPC ....... *H04W 72/21* (2023.01); *H04W 72/1268* (2013.01)

(58) Field of Classification Search
CPC ... H04W 72/21; H04W 72/1268; H04W 4/70; H04L 5/0055
See application file for complete search history.

(56) References Cited

U.S. PATENT DOCUMENTS

2020/0220649 A1* 7/2020 Liu .......................... H04W 4/70
2020/0287697 A1 9/2020 Yang
(Continued)

FOREIGN PATENT DOCUMENTS

CN 109560905 A 4/2019
CN 111316736 A 6/2020
WO 2020033895 A1 2/2020
(Continued)

OTHER PUBLICATIONS

Americas (LTE Carrier Aggregation Technology Development and Deployment Worldwide, 4G Americas, Oct. 2014) (Year: 2014).*
(Continued)

*Primary Examiner* — Vinncelas Louis
(74) *Attorney, Agent, or Firm* — Perilla Knox & Hildebrandt; Kenneth A. Knox

(57) ABSTRACT

An uplink transmission method and apparatus, an uplink receiving method and apparatus, a device, and a storage medium. The method includes: in a case that an uplink control channel conflicts with an uplink data channel, performing multiplexing transmission for uplink control information and uplink transmission, where a transmission resource of the uplink transmission and a transmission resource of the uplink control channel overlap, and the uplink transmission meets a preset condition.

19 Claims, 4 Drawing Sheets

Start

In a case that an uplink control channel conflicts with an uplink data channel, perform multiplexing transmission for uplink control information and uplink transmission ⟋ 201

End

(56)                References Cited

U.S. PATENT DOCUMENTS

2020/0288438 A1     9/2020  Takeda et al.
2021/0337536 A1*   10/2021  Li ......................... H04L 5/0055

FOREIGN PATENT DOCUMENTS

WO          2020065724  A1      4/2020
WO          2020141996  A1      7/2020

OTHER PUBLICATIONS

International Search Report and Written Opinion for Application No. PCT /CN2021/106434, dated Sep. 28, 2021, 7 Pages.
Huawei et al. "Clarification on UCI multiplexing on PUSCH" 3GPP TSG RAN WG1 Meeting #100bis-e, E-Meeting, RI-2002581, Apr. 2020, 5 Pages.
Huawei et al. "Corrections on dynamic PUSCH skipping with overlapping with PUCCH" 3GPP TSG RAN WG1 Meeting #100bis-e, E-Meeting, RI-2002669, Apr. 2020, 4 Pages.
Huawei et al. "Clarification on UCI multiplexing on PUSCH" 3GPP TSG RAN WG1 Meeting #101-e, E-Meeting, RI-2004614, Jun. 2020, 3 Pages.
Huawei et al. "Corrections on dynamic PUSCH skipping with overlapping with PUCCH" 3GPP TSG RAN WG1 Meeting #101-e, E-Meeting, RI-2004616, Jun. 2020, 4 Pages.
First Office Action for Indian Application No. 202317003657, dated Nov. 20, 2023, 5 Pages.
First Office Action for KR Patent Application No. 10-2023-7004899 of May 14, 2025.
First Office Action for SG Patent Application No. 11202300184W of Jul. 25, 2025.
3GPP TSG RAN WG1 #101 R1-2003705, Clarification on dynamic PUSCH skipping with overlapping CSI/HARQ-ACK on PUCCH, e-Meeting, May 25-Jun. 5, 2020, Agenda item 7.1.3, Source: ZTE, Document for: Discussion and Decision.
First Office Action for SG Patent Application No. 10-2023-7004899 of Jul. 25, 2025.
First Office Action for EP Patent Application No. 218422616 of Dec. 2, 2025.
Second Office Action for JP Patent Application No. 2023502857 of Sep. 16, 2025.

* cited by examiner

12

Network-side device

11

Terminal

Start

In a case that an uplink control channel conflicts with an uplink data channel, perform multiplexing transmission for uplink control information and uplink transmission    201

End

UPLINK TRANSMISSION METHOD AND APPARATUS, UPLINK RECEIVING METHOD AND APPARATUS, DEVICE, AND STORAGE MEDIUM

CROSS-REFERENCE TO RELATED APPLICATIONS

This application is a continuation of PCT International Application No. PCT/CN2021/106434 filed on Jul. 15, 2021, which claims priority to Chinese Patent Application No. 202010683119.9, filed on Jul. 15, 2020, which are incorporated herein by reference in their entireties.

TECHNICAL FIELD

This application relates to the field of communications technologies, and in particular, to an uplink transmission method and apparatus, an uplink receiving method and apparatus, a device, and a storage medium.

BACKGROUND

In some communications systems, a terminal usually needs to send uplink control information (UCI) to a network-side device. Further, an uplink skipping (UL skipping) function may be configured in some scenarios. For a carrier on which the uplink skipping function is enabled by the terminal, uplink transmission on the carrier is sent only when data is transmitted at a medium access control (MAC) layer of the carrier. In this case, the network-side device does not know whether the terminal sends uplink transmission on some carriers, that is, the network-side device is not sure of whether the terminal sends uplink transmission on some carriers. In this case, in a case that the terminal is configured with a plurality of carriers and the uplink skipping function is enabled on all the plurality of carriers, the network-side device cannot determine a specific carrier on which uplink control information is to be transmitted. Therefore, the network-side device may need to perform blind detection on the plurality of carriers to receive the uplink control information, resulting in high complexity of blind detection by the network-side device.

SUMMARY

According to a first aspect, this application provides an uplink transmission method, applied to a terminal and including:

in a case that an uplink control channel conflicts with an uplink data channel, performing multiplexing transmission for uplink control information and uplink transmission, where a transmission resource of the uplink transmission and a transmission resource of the uplink control channel overlap, and the uplink transmission meets a preset condition.

According to a second aspect, this application provides an uplink receiving method, applied to a network-side device and including:

in a case that an uplink control channel conflicts with an uplink data channel, receiving uplink control information and uplink transmission, where multiplexing transmission is performed for the uplink control information and the uplink transmission, where a transmission resource of the uplink transmission and a transmission resource of the uplink control channel overlap, and the uplink transmission meets a preset condition.

According to a third aspect, this application provides an uplink transmission apparatus, applied to a terminal and including:

a transmission module, configured to: in a case that an uplink control channel conflicts with an uplink data channel, perform multiplexing transmission for uplink control information and uplink transmission, where a transmission resource of the uplink transmission and a transmission resource of the uplink control channel overlap, and the uplink transmission meets a preset condition.

According to a fourth aspect, this application provides an uplink receiving apparatus, applied to a network-side device and including:

a receiving module, configured to: in a case that an uplink control channel conflicts with an uplink data channel, receive uplink control information and uplink transmission, where multiplexing transmission is performed for the uplink control information and the uplink transmission, where a transmission resource of the uplink transmission and a transmission resource of the uplink control channel overlap, and the uplink transmission meets a preset condition.

According to a fifth aspect, this application provides a terminal, including a memory, a processor, and a program or instructions stored in the memory and capable of running on the processor, where when the program or instructions are executed by the processor, the steps of the uplink transmission method provided in this application are implemented.

According to a sixth aspect, this application provides a network-side device, including a memory, a processor, and a program or instructions stored in the memory and capable of running on the processor, where when the program or instructions are executed by the processor, the steps of the uplink receiving method provided in this application are implemented.

According to a seventh aspect, this application provides a readable storage medium, where the readable storage medium stores a program or instructions, and when the program or instructions are executed by a processor, the steps of the uplink transmission method provided in this application are implemented, or when the program or instructions are executed by a processor, the steps of the uplink receiving method provided in this application are implemented.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that the data used in this way is interchangeable in appropriate circumstances, so that the embodiments of this application can be implemented in other orders than the order illustrated or described herein. In addition, the objects distinguished by "first" and "second" usually belong to one category, and the number of objects is not limited. For example, there may be one or more first objects. In addition, in the specification and claims, "and/or" represents at least one of connected objects, and the character "/" typically represents an "or" relationship between the associated objects.

It should be noted that the technologies described in the embodiments of this application are not limited to a long term evolution (LTE)/LTE-advanced (LTE-A) system, and may be further used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to applications other than an NR system application, for example, a 6th generation (6G) communications system.

Figures 1, 2:
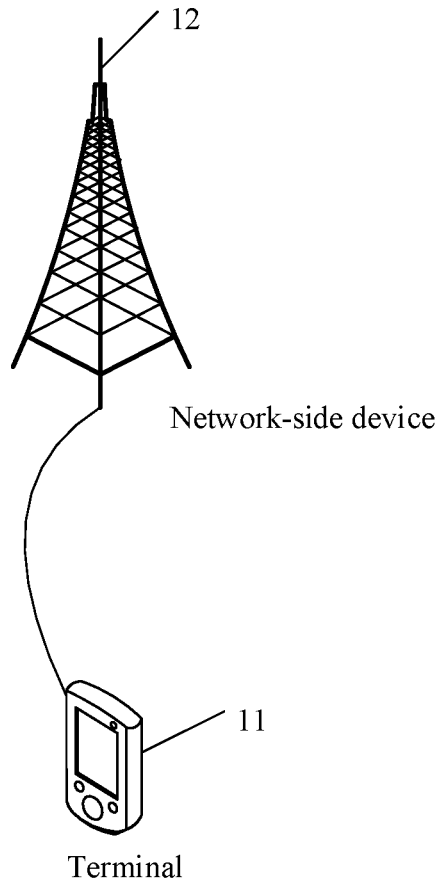
FIG. 1 is a block diagram of a wireless communications system to which an embodiment of this application is applicable.
FIG. 2 is a flowchart of an uplink transmission method according to an embodiment of this application.

FIG. 1 is a block diagram of a wireless communications system to which an embodiment of this application is applicable. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), vehicle user equipment (VUE), pedestrian user equipment (PUE), or RedCap UE. The RedCap UE may include a wearable device, an industrial sensor, a video surveillance device, or the like. The wearable device includes a band, a headset, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, a transmitting receiving point (TRP), or another appropriate term in the art. Provided that the same technical effects are achieved, the base station is not limited to a specific technical term. It should be noted that the base station in the NR system is only used as an example in the embodiments of this application, but a specific type of the base station is not limited.

The following describes in detail an uplink transmission method and apparatus, an uplink receiving method and apparatus, a device, and a storage medium provided in the embodiments of this application with reference to the accompanying drawings and by using specific embodiments and application scenarios thereof.

FIG. 2 is a flowchart of an uplink transmission method according to an embodiment of this application. The method is applied to a terminal, and as shown in FIG. 2, includes the following steps.

Step 201: In a case that an uplink control channel conflicts with an uplink data channel, perform multiplexing transmission for uplink control information and uplink transmission.

A transmission resource of the uplink transmission and a transmission resource of the uplink control channel overlap, and the uplink transmission meets a preset condition.

That the uplink control channel conflicts with the uplink data channel may be that the transmission resource of the uplink control channel conflicts with a transmission resource of the uplink data channel, for example, some resources overlap, or all resources overlap.

The uplink transmission and the uplink data channel may belong to one carrier or different carriers. That the transmission resource of the uplink transmission and the transmission resource of the uplink control channel overlap may be that the transmission resource of the uplink transmission and the transmission resource of the uplink control channel partially or completely overlap.

The preset condition is known to a network-side device. For example, the preset condition may be agreed upon in a protocol, configured by the network-side device for the terminal, or pre-negotiated upon by the terminal and the network-side device, or the like.

It should be noted that, in this embodiment of this application, the uplink transmission may be understood as an uplink signal, for example, uplink data (for example, data information) or an uplink report, for example, an uplink signal transmitted through a physical uplink shared channel (PUSCH).

In addition, the uplink control channel in this embodiment of this application may be a physical uplink control channel (PUCCH).

Further, the terminal may generate the uplink control information before performing step 201.

In this embodiment of this application, because multiplexing transmission is performed for the uplink control information and the uplink transmission that meets the preset condition, the network-side device can obtain the uplink control information by performing blind detection on the uplink transmission that meets the preset condition, thereby reducing complexity of blind detection by the network-side device. Further, when sending the uplink control information, the terminal does not need to determine a specific carrier on which data is transmitted at a MAC layer, but directly multiplexes the uplink control information to the uplink transmission that meets the preset condition, thereby reducing complexity of multiplexing the uplink control information and the uplink transmission by the terminal.

For example, when the terminal is configured with one or more (M, where M>2) carriers, when a resource conflict occurs between the uplink control channel and an uplink DG or CG data channel, and when the network-side device enables (or referred to as enabling) an uplink transmission skipping (UL skipping) function in an uplink data channel of one or N (1<N≤M) carriers of the terminal, the network-side device can still determine a specific carrier on which the uplink control information is multiplexed to an uplink data channel, to reduce blind detection by the network-side device, and reduce complexity of multiplexing the uplink control information and the uplink transmission by the terminal.

In addition, this embodiment of the application may be applied to a dynamic grant (DG) or configured grant (CG) scenario. For example, the uplink transmission may be DG uplink transmission or CG uplink transmission.

In an optional implementation, in a case that the uplink data channel is a dynamic grant, the preset condition includes:

a carrier to which the uplink transmission belongs is a carrier on which an uplink skipping (UL skipping) function is prohibited from being enabled or is not configured, where the carrier on which the uplink skipping function is prohibited from being enabled or is not configured includes at least one of the following:

a primary carrier or a carrier with the smallest carrier index in a carrier group.

The primary carrier may include at least one of the following:

a primary cell (PCell) or a primary secondary cell (PS-Cell).

The carrier with the smallest carrier index in the carrier group may be an active carrier with the smallest carrier index number in the carrier group. In addition, the carrier group may be a cell group.

For example, when the terminal is configured with carrier aggregation and is configured with a PCell and a PUCCH SCell, the first PUCCH cell group needs to include a PCell, but cannot include a PUCCH SCell, where the smallest carrier index number in the first PUCCH cell group corresponds to the PCell, and the index number may be 0; and the second PUCCH cell group includes carriers other than all carriers in the first PUCCH cell group, where a correspondence of the smallest carrier index number in the second PUCCH cell group depends on the smallest value of all carrier index numbers in the second PUCCH cell group.

The carrier on which the uplink skipping function is prohibited from being enabled or is not configured may be understood as follows: The uplink skipping function of the terminal cannot be enabled (or referred to as being enabled) on the primary carrier and/or the carrier with the smallest carrier index.

In this implementation, because the carrier to which the uplink transmission belongs is a carrier on which the uplink skipping function is prohibited from being enabled or is not configured, the network-side device can obtain the uplink control information by performing blind detection only on the carrier, so that complexity of blind detection by the network-side device can be reduced. Further, because the carrier to which the uplink transmission belongs is a carrier on which the uplink skipping function is prohibited from being enabled or is not configured, the terminal does not need to determine a specific carrier on which data is transmitted at a MAC layer. A reason is that, for the carrier on which the uplink skipping function is prohibited from being enabled or is not configured, the terminal may directly perform multiplexing transformation for the uplink control information and uplink transmission on the carrier.

Further, in this implementation, the carrier to which the uplink transmission belongs may be the same as the carrier to which the uplink data channel belongs, or the uplink transmission may be dynamic grant uplink transmission.

In an optional implementation, the preset condition includes:

the uplink transmission is uplink transmission scheduled by the network-side device.

The uplink transmission scheduled by the network-side device may be dynamic grant or configured grant uplink transmission scheduled by the network-side device.

The uplink transmission scheduled by the network-side device may be that the terminal receives a scheduling message sent by the network-side device, and generates the uplink transmission based on the scheduling message.

Further, the uplink transmission scheduled by the network-side device may be uplink transmission scheduled when the network-side device is not sure of whether uplink transmission is sent on one or more carriers. For example, the network-side device is not sure of whether uplink transmission is sent on a carrier, of the terminal, on which the uplink skipping function is enabled, and schedules the uplink transmission, so that the terminal performs multiplexing transmission for the uplink control information and the uplink transmission. For another example, the network-side device is not sure of whether uplink transmission is sent on a configured grant carrier of the terminal, and schedules the uplink transmission, so that the terminal performs multiplexing transmission for the uplink control information and the uplink transmission.

In this implementation, because multiplexing transmission is performed for the uplink control information and the uplink transmission scheduled by the network-side device, the terminal does not need to determine a specific carrier on which data is transmitted at a MAC layer, thereby reducing complexity of multiplexing the uplink control information and the uplink transmission by the terminal. In addition, the network-side device can directly perform blind detection on the uplink transmission to obtain the uplink control information, thereby further reducing complexity of blind detection by the network-side device.

Optionally, the uplink data channel is a dynamic grant or a configured grant.

In a case that the uplink data channel is a configured grant, the uplink transmission may be dynamic grant or configured grant uplink transmission. For example, for a configured grant carrier, when the network-side device is not sure of whether uplink transmission is performed on a configured grant of the carrier, the network-side device may schedule determined uplink transmission on a dynamic or configured grant of the carrier or another carrier, so that the terminal multiplexes the uplink control information to the determined uplink transmission.

In a case that the uplink data channel is a dynamic grant, the uplink transmission may be configured grant or dynamic grant uplink transmission.

Optionally, in a case that the uplink data channel is a dynamic grant, the terminal enables an uplink skipping function on at least one carrier, and the uplink data channel belongs to the carrier on which the uplink skipping function is enabled.

In this implementation, the network-side device can schedule the uplink transmission when the uplink data channel of the carrier on which the uplink skipping function is enabled conflicts with the uplink control channel. For example, when the network-side device cannot determine whether uplink transmission is performed on the carrier, of the terminal, on which the uplink skipping function is enabled, and a resource conflict occurs between the resource of the uplink control channel and the indeterminate uplink transmission, the network-side device schedules uplink transmission, where the network-side device determines that the uplink transmission is to be sent by the terminal. An uplink data channel occupied by the uplink transmission overlaps the resource of the uplink control channel, so that the uplink control information is multiplexed to the determined uplink transmission.

Further, in this implementation, the carrier, of the terminal, on which the uplink skipping function is prohibited from being enabled or is not configured may include at least one of the following:

a primary carrier or a carrier with the smallest carrier index in a carrier group.

In this implementation, the uplink transmission scheduled by the network-side device may be dynamic grant uplink transmission, for example, dynamic grant uplink transmission on the carrier on which the uplink skipping function is prohibited from being enabled or is not configured. Certainly, this is not limited, and the uplink transmission scheduled by the network-side device may be alternatively configured grant uplink transmission.

Optionally, the carrier to which the uplink transmission belongs is the same as or different from the carrier to which the uplink data channel belongs.

In this implementation, the network-side device can schedule uplink transmission on a carrier that is the same as or different from the carrier to which the uplink data channel belongs, to improve flexibility of scheduling. In addition, the uplink skipping function may not be enabled or configured on the carrier to which the uplink transmission belongs, or the uplink skipping function is enabled on the carrier to which the uplink transmission belongs. For example, the uplink transmission scheduled by the network-side device may be scheduling of a PUSCH on any carrier on which the uplink skipping function is not enabled.

Optionally, in a case that the carrier to which the uplink transmission belongs is the same as the carrier to which the uplink data channel belongs, the uplink skipping function is enabled on the carrier to which the uplink transmission belongs; or in a case that the carrier to which the uplink transmission belongs is different from the carrier to which the uplink data channel belongs, the uplink skipping function is not enabled or configured on the carrier to which the uplink transmission belongs, or the uplink skipping function is enabled on the carrier to which the uplink transmission belongs.

For example, the uplink transmission may be uplink transmission triggered on any carrier, or the uplink transmission may be scheduling of a PUSCH on any carrier on which uplink skipping is not enabled or is not configured.

It should be noted that, if the uplink data channel is configured grant uplink data channel, in a case that the carrier to which the uplink transmission belongs is the same as the carrier to which the uplink data channel belongs, the carrier to which the uplink transmission belongs may be alternatively a carrier on which the uplink skipping function is not enabled or is not configured.

Optionally, the uplink transmission includes:

aperiodic channel state information (A-CSI).

For example, the network-side device may schedule the terminal to send the A-CSI on any carrier. This can reduce complexity of blind detection by the network-side device and reduce complexity of multiplexing the uplink control information and the uplink transmission by the terminal, and can further enable the terminal to report channel state information in a timely manner.

It should be noted that, in this embodiment of this application, the uplink transmission is not limited to the A-CSI, and may be alternatively information that may be reported by another terminal, or may be uplink transmission filled with a preset bit or a PUSCH scheduled on any other carrier on which uplink skipping is not enabled or is not configured.

For example, for a configured grant carrier, when the network-side device is not sure of whether uplink transmission is performed on a configured grant of the carrier, the network-side device may schedule determined uplink transmission on the carrier or another carrier, so that the terminal multiplexes the uplink control information to the determined uplink transmission. The uplink transmission may be A-CSI of a triggered uplink data channel, or may be a DG PUSCH scheduled on a carrier on which the uplink skipping function is not enabled or is not configured.

In an optional implementation, the preset condition includes:

the uplink transmission is a configured grant.

In this implementation, the uplink control information can be directly multiplexed to uplink transmission of a configured grant carrier. In addition, the uplink transmission and the uplink data channel belong to one carrier, that is, the uplink control information and the uplink transmission are multiplexed in the uplink data channel for transmission.

Optionally, the uplink transmission includes:

uplink transmission generated in a case that data transmission is performed on the carrier to which the uplink transmission belongs; or uplink transmission generated in a case that no data transmission is performed on the carrier to which the uplink transmission belongs.

In this implementation, regardless of whether configured grant data transmission is performed, a MAC layer of the terminal generates a MAC protocol data unit PDU and delivers the PDU to a physical layer. The physical layer multiplexes the uplink control information to the configured grant uplink data channel, that is, multiplexes the uplink control information to the uplink transmission.

In this implementation, the uplink transmission can be generated in a case that data transmission is performed or no data transmission is performed on the carrier to which the uplink transmission belongs. This can reduce complexity of multiplexing the uplink control information and the uplink transmission by the terminal, and reduce complexity of blind detection by the network-side device.

Optionally, the uplink transmission includes:

uplink transmission generated on a carrier with the smallest carrier index among a plurality of carriers in a case that the plurality of carriers are configured with configured grants; or uplink transmission generated on a target configured grant of one carrier in a case that the one carrier is configured with a plurality of configured grants.

It should be noted that the uplink transmission generated herein may be uplink transmission generated in a case that data transmission is performed or no data transmission is performed on the carrier.

The target configured grant may include at least one of the following configured grants of the one carrier:

a configured grant with the smallest index, a configured grant with the earliest transmission start time, or a configured grant with the latest transmission start time.

In this implementation, if the terminal configures configured grants on a plurality of carriers, the uplink transmission can be generated on the carrier with the smallest carrier index value, for example, a CG PUSCH. In addition, if the terminal configures a plurality of configured grants on one carrier, the uplink transmission can be generated on at least one of a configured grant with the smallest index value, a configured grant with the earliest transmission start time, or a configured grant with the latest transmission start time, for example, a CG PUSCH.

In this embodiment of this application, in a case that the uplink control channel conflicts with the uplink data channel, multiplexing transmission is performed for the uplink control information and the uplink transmission, where the transmission resource of the uplink transmission and the transmission resource of the uplink control channel overlap, and the uplink transmission meets the preset condition. Because the uplink transmission meets the preset condition, the network-side device can obtain the uplink control information by detecting only the uplink transmission that meets the preset condition, to reduce complexity of blind detection by the network-side device.

Figure 3:
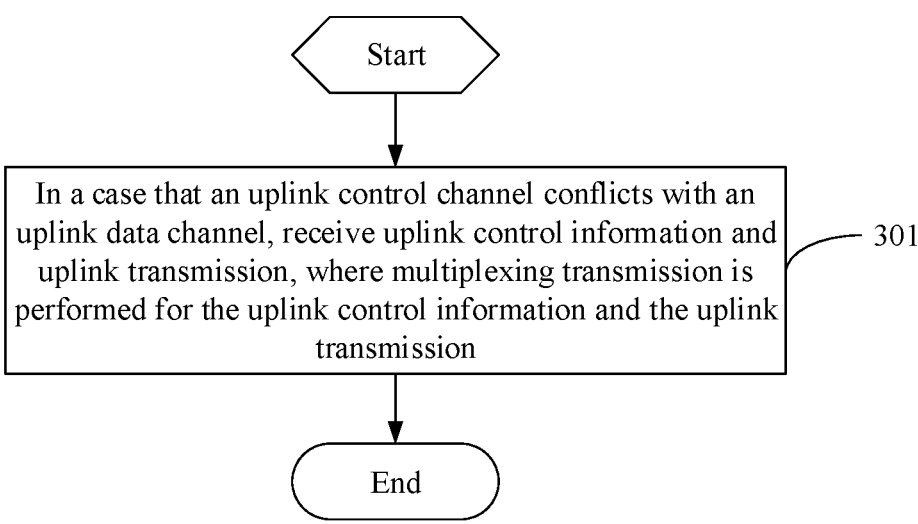
FIG. 3 is a flowchart of an uplink receiving method according to an embodiment of this application.

FIG. 3 is a flowchart of an uplink receiving method according to an embodiment of this application. The method is applied to a network-side device, and as shown in FIG. 3, includes the following steps.

Step 301: In a case that an uplink control channel conflicts with an uplink data channel, receive uplink control information and uplink transmission, where multiplexing transmission is performed for the uplink control information and the uplink transmission.

A transmission resource of the uplink transmission and a transmission resource of the uplink control channel overlap, and the uplink transmission meets a preset condition.

Optionally, in a case that the uplink data channel is a dynamic grant, the preset condition includes:

a carrier to which the uplink transmission belongs is a carrier, of a terminal, on which an uplink skipping function is prohibited from being enabled or is not configured, where the carrier on which the uplink skipping function is prohibited from being enabled or is not configured includes at least one of the following:

a primary carrier or a carrier with the smallest carrier index in a carrier group.

Optionally, the preset condition includes:

the uplink transmission is uplink transmission scheduled by the network-side device.

Optionally, the uplink data channel is a dynamic grant or a configured grant.

Optionally, in a case that the uplink data channel is a dynamic grant, the uplink data channel belongs to a carrier on which the uplink skipping function is enabled.

Optionally, the carrier to which the uplink transmission belongs is the same as or different from the carrier to which the uplink data channel belongs.

Optionally, in a case that the carrier to which the uplink transmission belongs is the same as the carrier to which the uplink data channel belongs, the uplink skipping function is enabled on the carrier to which the uplink transmission belongs; or in a case that the carrier to which the uplink transmission belongs is different from the carrier to which the uplink data channel belongs, the uplink skipping function is not enabled or configured on the carrier to which the uplink transmission belongs, or the uplink skipping function is enabled on the carrier to which the uplink transmission belongs.

Optionally, the uplink transmission includes:

aperiodic channel state information A-CSI.

Optionally, the preset condition includes:

the uplink transmission is a configured grant.

The uplink transmission includes:

uplink transmission generated in a case that data transmission is performed on the carrier to which the uplink transmission belongs; or uplink transmission generated in a case that no data transmission is performed on the carrier to which the uplink transmission belongs.

Optionally, the uplink transmission includes:

uplink transmission generated on a carrier with the smallest carrier index among a plurality of carriers in a case that the plurality of carriers are configured with configured grants; or uplink transmission generated on a target configured grant of one carrier in a case that the one carrier is configured with a plurality of configured grants.

Optionally, the target configured grant includes at least one of the following configured grants of the one carrier:

a configured grant with the smallest index, a configured grant with the earliest transmission start time, or a configured grant with the latest transmission start time.

It should be noted that this embodiment is a network-side implementation corresponding to the embodiment shown in FIG. 2. For a specific implementation of this embodiment, refer to related descriptions of the embodiment shown in FIG. 2. To avoid repetition, details are not described in this embodiment again. In this embodiment, complexity of blind detection by the network-side device can also be reduced.

Figure 4:
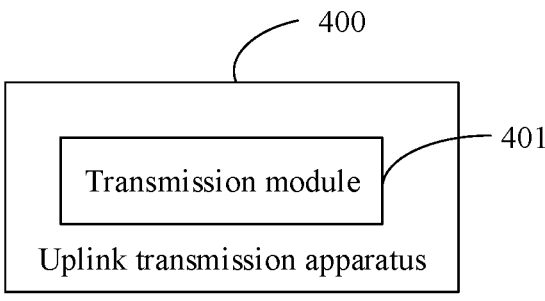
FIG. 4 is a structural diagram of an uplink transmission apparatus according to an embodiment of this application.

FIG. 4 is a structural diagram of an uplink transmission apparatus according to an embodiment of this application. As shown in FIG. 4, the uplink transmission apparatus 400 includes:

a transmission module 401, configured to: in a case that an uplink control channel conflicts with an uplink data channel, perform multiplexing transmission for uplink control information and uplink transmission, where a transmission resource of the uplink transmission and a transmission resource of the uplink control channel overlap, and the uplink transmission meets a preset condition.

Optionally, the preset condition includes:

a carrier to which the uplink transmission belongs is a carrier on which the uplink skipping function is prohibited from being enabled or is not configured, where the carrier on which the uplink skipping function is prohibited from being enabled or is not configured includes at least one of the following:

a primary carrier or a carrier with the smallest carrier index in a carrier group.

Optionally, the preset condition includes:

the uplink transmission is uplink transmission scheduled by a network-side device.

Optionally, the uplink data channel is a dynamic grant or a configured grant.

Optionally, in a case that the uplink data channel is a dynamic grant, a terminal enables an uplink skipping function on at least one carrier, and the uplink data channel belongs to the carrier on which the uplink skipping function is enabled.

Optionally, the carrier, of the terminal, on which the uplink skipping function is prohibited from being enabled or is not configured includes at least one of the following:

a primary carrier or a carrier with the smallest carrier index in a carrier group.

Optionally, the carrier to which the uplink transmission belongs is the same as or different from the carrier to which the uplink data channel belongs.

Optionally, in a case that the carrier to which the uplink transmission belongs is the same as the carrier to which the uplink data channel belongs, the uplink skipping function is enabled on the carrier to which the uplink transmission belongs; or in a case that the carrier to which the uplink transmission belongs is different from the carrier to which the uplink data channel belongs, the uplink skipping function is not enabled or configured on the carrier to which the uplink transmission belongs, or the uplink skipping function is enabled on the carrier to which the uplink transmission belongs.

Optionally, the uplink transmission includes:

aperiodic channel state information A-CSI.

Optionally, the preset condition includes:

the uplink transmission is a configured grant.

Optionally, the uplink transmission includes:

uplink transmission generated in a case that data transmission is performed on the carrier to which the uplink transmission belongs; or uplink transmission generated in a case that no data transmission is performed on the carrier to which the uplink transmission belongs.

Optionally, the uplink transmission includes:

uplink transmission generated on a carrier with the smallest carrier index among a plurality of carriers in a case that the plurality of carriers are configured with configured grants; or uplink transmission generated on a target configured grant of one carrier in a case that the one carrier is configured with a plurality of configured grants.

Optionally, the target configured grant includes at least one of the following configured grants of the one carrier:

a configured grant with the smallest index, a configured grant with the earliest transmission start time, or a configured grant with the latest transmission start time.

The uplink transmission apparatus provided in this embodiment of the present application is capable of implementing the processes in the method embodiment of FIG. 2. To avoid repetition, details are not described herein again. In addition, complexity of blind detection by the network-side device can be reduced.

It should be noted that the uplink transmission apparatus in this embodiment of this application may be an apparatus, or may be a component, an integrated circuit, or a chip in a terminal.

Figure 5:
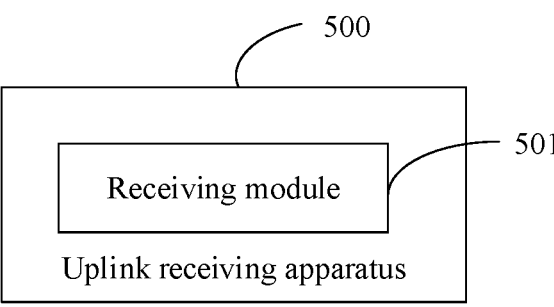
FIG. 5 is a structural diagram of another uplink receiving apparatus according to an embodiment of this application.

FIG. 5 is a structural diagram of an uplink receiving apparatus according to an embodiment of this application. As shown in FIG. 5, the uplink receiving apparatus 500 includes:

a receiving module 501, configured to: in a case that an uplink control channel conflicts with an uplink data channel, receive uplink control information and uplink transmission, where multiplexing transmission is performed for the uplink control information and the uplink transmission, where a transmission resource of the uplink transmission and a transmission resource of the uplink control channel overlap, and the uplink transmission meets a preset condition.

Optionally, in a case that the uplink data channel is a dynamic grant, the preset condition includes:

a carrier to which the uplink transmission belongs is a carrier, of a terminal, on which an uplink skipping function is prohibited from being enabled or is not configured, where the carrier on which the uplink skipping function is prohibited from being enabled or is not configured includes at least one of the following:

a primary carrier or a carrier with the smallest carrier index in a carrier group.

Optionally, the preset condition includes:

the uplink transmission is uplink transmission scheduled by a network-side device.

Optionally, the uplink data channel is a dynamic grant or a configured grant.

Optionally, in a case that the uplink data channel is a dynamic grant, the uplink data channel belongs to a carrier on which the uplink skipping function is enabled.

Optionally, the carrier to which the uplink transmission belongs is the same as or different from the carrier to which the uplink data channel belongs.

Optionally, in a case that the carrier to which the uplink transmission belongs is the same as the carrier to which the uplink data channel belongs, the uplink skipping function is enabled on the carrier to which the uplink transmission belongs; or in a case that the carrier to which the uplink transmission belongs is different from the carrier to which the uplink data channel belongs, the uplink skipping function is not enabled or configured on the carrier to which the uplink transmission belongs, or the uplink skipping function is enabled on the carrier to which the uplink transmission belongs.

Optionally, the uplink transmission includes:

aperiodic channel state information A-CSI.

Optionally, the preset condition includes:

the uplink transmission is a configured grant.

The uplink transmission includes:

uplink transmission generated in a case that data transmission is performed on the carrier to which the uplink transmission belongs; or uplink transmission generated in a case that no data transmission is performed on the carrier to which the uplink transmission belongs.

Optionally, the uplink transmission includes:

uplink transmission generated on a carrier with the smallest carrier index among a plurality of carriers in a case that the plurality of carriers are configured with configured grants; or uplink transmission generated on a target configured grant of one carrier in a case that the one carrier is configured with a plurality of configured grants.

Optionally, the target configured grant includes at least one of the following configured grants of the one carrier:

a configured grant with the smallest index, a configured grant with the earliest transmission start time, or a configured grant with the latest transmission start time.

The uplink receiving apparatus provided in this embodiment of the present application is capable of implementing the processes in the method embodiment of FIG. 3. To avoid repetition, details are not described herein again. In addition, complexity of blind detection by the network-side device can be reduced.

It should be noted that the uplink receiving apparatus in this embodiment of this application may be an apparatus, or may be a component, an integrated circuit, or a chip in a network-side device.

Figure 6:
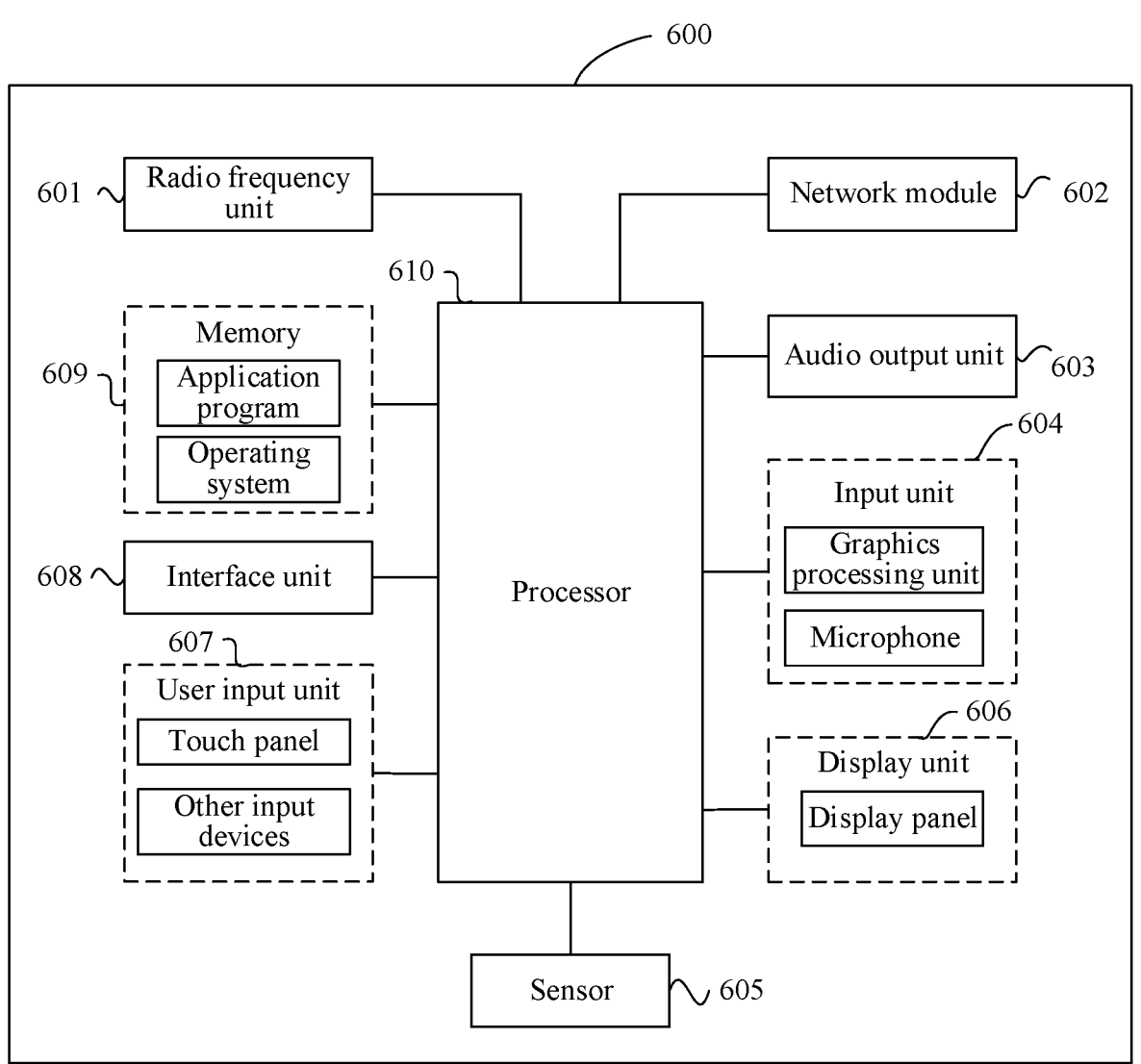
FIG. 6 is a structural diagram of a terminal according to an embodiment of this application.

FIG. 6 is a schematic diagram of a hardware structure of a terminal for implementing an embodiment of this application.

The terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

Persons skilled in the art can understand that the terminal 600 may further include a power supply (for example, a battery) that supplies power to each component. The power supply may be logically connected to the processor 610 by using a power management system, to implement functions such as charging management, discharging management, and power consumption management by using the power management system. The structure of the terminal shown in FIG. 6 does not constitute a limitation on the terminal. The terminal may include more or fewer components than those shown in the figure, or some components may be combined, or there may be a different component layout. Details are not described herein again.

The radio frequency unit 601 is configured to: in a case that an uplink control channel conflicts with an uplink data channel, perform multiplexing transmission for uplink control information and uplink transmission, where a transmission resource of the uplink transmission and a transmission resource of the uplink control channel overlap, and the uplink transmission meets a preset condition.

Optionally, the preset condition includes:

a carrier to which the uplink transmission belongs is a carrier on which the uplink skipping function is prohibited from being enabled or is not configured, where the carrier on which the uplink skipping function is prohibited from being enabled or is not configured includes at least one of the following:

a primary carrier or a carrier with the smallest carrier index in a carrier group.

Optionally, the preset condition includes:

the uplink transmission is uplink transmission scheduled by a network-side device.

Optionally, the uplink data channel is a dynamic grant or a configured grant.

Optionally, in a case that the uplink data channel is a dynamic grant, a terminal enables an uplink skipping function on at least one carrier, and the uplink data channel belongs to the carrier on which the uplink skipping function is enabled.

Optionally, the carrier, of the terminal, on which the uplink skipping function is prohibited from being enabled or is not configured includes at least one of the following:

a primary carrier or a carrier with the smallest carrier index in a carrier group.

Optionally, the carrier to which the uplink transmission belongs is the same as or different from the carrier to which the uplink data channel belongs.

Optionally, in a case that the carrier to which the uplink transmission belongs is the same as the carrier to which the uplink data channel belongs, the uplink skipping function is enabled on the carrier to which the uplink transmission belongs; or in a case that the carrier to which the uplink transmission belongs is different from the carrier to which the uplink data channel belongs, the uplink skipping function is not enabled or configured on the carrier to which the uplink transmission belongs, or the uplink skipping function is enabled on the carrier to which the uplink transmission belongs.

Optionally, the uplink transmission includes:

aperiodic channel state information A-CSI.

Optionally, the preset condition includes:

the uplink transmission is a configured grant.

Optionally, the uplink transmission includes:

uplink transmission generated in a case that data transmission is performed on the carrier to which the uplink transmission belongs; or uplink transmission generated in a case that no data transmission is performed on the carrier to which the uplink transmission belongs.

Optionally, the uplink transmission includes:

uplink transmission generated on a carrier with the smallest carrier index among a plurality of carriers in a case that the plurality of carriers are configured with configured grants; or uplink transmission generated on a target configured grant of one carrier in a case that the one carrier is configured with a plurality of configured grants.

Optionally, the target configured grant includes at least one of the following configured grants of the one carrier:

a configured grant with the smallest index, a configured grant with the earliest transmission start time, or a configured grant with the latest transmission start time.

With the terminal, complexity of blind detection by the network-side device can be reduced.

Optionally, an embodiment of the present application further provides a terminal, including a processor 610, a memory 609, and a program or instructions stored in the memory 609 and capable of running on the processor 610, where when the program or instructions are executed by the processor 610, the processes of the foregoing embodiments of the uplink transmission method are implemented, with the same technical effects achieved. To avoid repetition, details are not described herein again.

Figure 7:
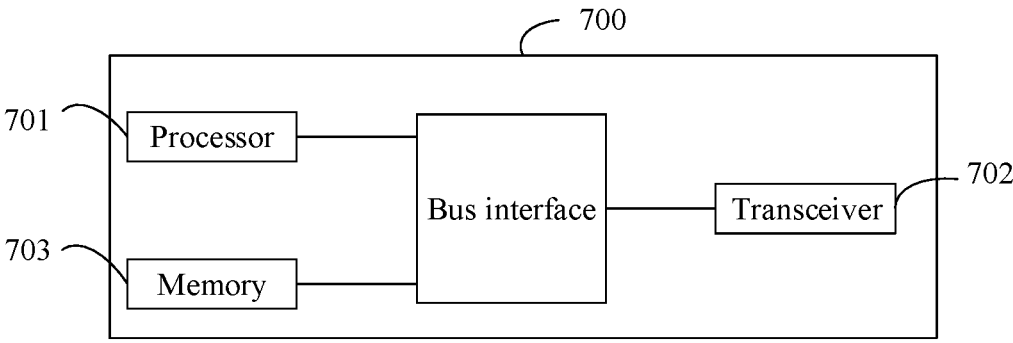
FIG. 7 is a structural diagram of a network-side device according to an embodiment of this application.

FIG. 7 is a structural diagram of a network-side device according to an embodiment of the present application. As shown in FIG. 7, the network-side device 700 includes a processor 701, a transceiver 702, a memory 703, and a bus interface.

The transceiver 702 is configured to: in a case that an uplink control channel conflicts with an uplink data channel, receive uplink control information and uplink transmission, where multiplexing transmission is performed for the uplink control information and the uplink transmission, where a transmission resource of the uplink transmission and a transmission resource of the uplink control channel overlap, and the uplink transmission meets a preset condition.

Optionally, in a case that the uplink data channel is a dynamic grant, the preset condition includes:

a carrier to which the uplink transmission belongs is a carrier, of a terminal, on which an uplink skipping function is prohibited from being enabled or is not configured, where

US 12,677,284 B2

15 the carrier on which the uplink skipping function is prohibited from being enabled or is not configured includes at least one of the following:
a primary carrier or a carrier with the smallest carrier index in a carrier group.
Optionally, the preset condition includes:
the uplink transmission is uplink transmission scheduled by the network-side device.
Optionally, the uplink data channel is a dynamic grant or a configured grant.
Optionally, in a case that the uplink data channel is a dynamic grant, the uplink data channel belongs to a carrier on which the uplink skipping function is enabled.
Optionally, the carrier to which the uplink transmission belongs is the same as or different from the carrier to which the uplink data channel belongs.
Optionally, in a case that the carrier to which the uplink transmission belongs is the same as the carrier to which the uplink data channel belongs, the uplink skipping function is enabled on the carrier to which the uplink transmission belongs; or
in a case that the carrier to which the uplink transmission belongs is different from the carrier to which the uplink data channel belongs, the uplink skipping function is not enabled or configured on the carrier to which the uplink transmission belongs, or the uplink skipping function is enabled on the carrier to which the uplink transmission belongs.
Optionally, the uplink transmission includes:
aperiodic channel state information A-CSI.
Optionally, the preset condition includes:
the uplink transmission is a configured grant.
The uplink transmission includes:
uplink transmission generated in a case that data transmission is performed on the carrier to which the uplink transmission belongs; or
uplink transmission generated in a case that no data transmission is performed on the carrier to which the uplink transmission belongs.
Optionally, the uplink transmission includes:
uplink transmission generated on a carrier with the smallest carrier index among a plurality of carriers in a case that the plurality of carriers are configured with configured grants; or
uplink transmission generated on a target configured grant of one carrier in a case that the one carrier is configured with a plurality of configured grants.
Optionally, the target configured grant includes at least one of the following configured grants of the one carrier:
a configured grant with the smallest index, a configured grant with the earliest transmission start time, or a configured grant with the latest transmission start time.
With the network-side device, complexity of blind detection by the network-side device can be reduced.
The transceiver 702 is configured to receive and send data under control of the processor 701. The transceiver 702 includes at least two antenna ports.
In FIG. 7, a bus architecture may include any quantity of interconnected buses and bridges, specifically for interconnecting various circuits of one or more processors represented by the processor 701 and a memory represented by the memory 703. The bus architecture may further interconnect various other circuits such as a peripheral device, a voltage regulator, and a power management circuit. These are all well known in the art, and therefore are not further described in this specification. The bus interface provides an interface. The transceiver 702 may be a plurality of components, including a transmitter and a receiver, and provides units for communicating with a variety of other apparatuses on a transmission medium. For different user equipments, the user interface 704 may also be an interface capable of externally or internally connecting a required device, and the connected device includes but is not limited to a keypad, a display, a speaker, a microphone, a joystick, and the like.
The processor 701 is responsible for management of the bus architecture and general processing, and the memory 703 may store data for use by the processor 701 when the processor 701 performs an operation.
An embodiment of the present application further provides a network-side device, including a processor 701, a memory 703, and a program or instructions stored in the memory 703 and capable of running on the processor 701, where when the program or instructions are executed by the processor 701, the processes of the foregoing embodiments of the uplink receiving method are implemented, with the same technical effects achieved. To avoid repetition, details are not described herein again.
An embodiment of this application further provides a readable storage medium. The readable storage medium stores a program or instructions. When the program or instructions are executed by a processor, the processes of the foregoing embodiments of the uplink transmission method or the uplink receiving method are implemented, with the same technical effects achieved. To avoid repetition, details are not described herein again.
The processor is a processor in the terminal or the network-side device in the foregoing embodiments. The readable storage medium includes a computer-readable storage medium, for example, a computer read-only memory (ROM), a random access memory (RAM), a magnetic disk, or an optical disc.
An embodiment of this application further provides a chip. The chip includes a processor and a communications interface. The communications interface is coupled to the processor. The processor is configured to run a program or instructions, to implement the processes of the foregoing embodiments of the uplink transmission method or the uplink receiving method, with the same technical effects achieved. To avoid repetition, details are not described herein again.
It should be understood that the chip provided in this embodiment of this application may also be referred to as a system-level chip, a system on chip, a chip system, a system-on-a-chip, or the like.
It can be understood that the embodiments described in this disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.
It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . ." does not preclude the existence of other identical elements in the process, method, article, or apparatus that includes the element. In addition, it should be noted that the scope of the method and apparatus in the implementations of this application is not limited to performing functions in the shown or described order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and certainly may be alternatively implemented by using hardware. However, in most cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in each embodiment of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An uplink transmission method, performed by a terminal and comprising:

in a case that an uplink control channel conflicts with an uplink data channel, performing multiplexing transmission for uplink control information and uplink transmission via the uplink data channel, wherein a transmission resource of the uplink transmission and a transmission resource of the uplink control channel overlap, and the uplink transmission meets a preset condition, wherein the uplink data channel is a dynamic grant, and the preset condition comprises:

a carrier to which the uplink transmission belongs is a carrier on which an uplink skipping function is prohibited from being enabled or is not configured, wherein the carrier on which the uplink skipping function is prohibited from being enabled or is not configured comprises at least one of the following:

a primary carrier or a carrier with the smallest carrier index in a carrier group.

2. The method according to claim 1, wherein the preset condition further comprises: the uplink transmission is uplink transmission scheduled by a network-side device.

3. The method according to claim 2, wherein in a case that the carrier to which the uplink transmission belongs is the same as the carrier to which the uplink data channel belongs, the uplink skipping function is enabled on the carrier to which the uplink transmission belongs; or in a case that the carrier to which the uplink transmission belongs is different from the carrier to which the uplink data channel belongs, the uplink skipping function is not enabled or configured on the carrier to which the uplink transmission belongs, or the uplink skipping function is enabled on the carrier to which the uplink transmission belongs.

4. The method according to claim 2, wherein the uplink transmission comprises: aperiodic channel state information A-CSI.

5. The method according to claim 2, wherein the uplink transmission scheduled by the network-side device comprises uplink transmission generated by the terminal based on scheduling message sent by the network-side device.

6. The method according to claim 1, wherein the uplink transmission comprises:

uplink transmission generated in a case that data transmission is performed on the carrier to which the uplink transmission belongs; or uplink transmission generated in a case that no data transmission is performed on the carrier to which the uplink transmission belongs; or wherein the uplink transmission comprises:

uplink transmission generated on a carrier with the smallest carrier index among a plurality of carriers in a case that the plurality of carriers are configured with configured grants; or uplink transmission generated on a target configured grant of one carrier in a case that the one carrier is configured with a plurality of configured grants.

7. The method according to claim 6, wherein the target configured grant comprises at least one of the following configured grants of the one carrier: a configured grant with the smallest index, a configured grant with the earliest transmission start time of the one carrier, or a configured grant with the latest transmission start time.

8. A terminal, comprising a memory, at least one hardware processor, and instructions stored in the memory and capable of running on the at least one hardware processor, wherein when the instructions are executed by the at least one hardware processor, the uplink transmission method according to claim 1 is implemented.

9. The method according to claim 1, wherein performing multiplexing transmission for uplink control information and uplink transmission via the uplink data channel comprises:

generating, by a medium access control (MAC) layer of the terminal, a MAC protocol data unit (PDU), and delivering the MAC PDU to a physical layer; and multiplexing, by the physical layer, the uplink control information to the uplink data channel.

10. The method according to claim 1, wherein the uplink transmission occupies the uplink data channel.

11. The method according to claim 1, wherein the terminal enables the uplink skipping function on the carrier, and the uplink data channel belongs to the carrier on which the uplink skipping function is enabled.

12. An uplink receiving method, performed by a network-side device and comprising:

in a case that an uplink control channel conflicts with an uplink data channel, receiving uplink control information and uplink transmission, wherein multiplexing transmission is performed for the uplink control information and the uplink transmission via the uplink data channel, wherein a transmission resource of the uplink transmission and a transmission resource of the uplink control channel overlap, and the uplink transmission meets a preset condition, wherein the uplink data channel is a dynamic grant, and the preset condition comprises:

a carrier to which the uplink transmission belongs is a carrier, of a terminal, on which an uplink skipping function is prohibited from being enabled or is not configured, wherein the carrier on which the uplink skipping function is prohibited from being enabled or is not configured comprises at least one of the following:

a primary carrier or a carrier with the smallest carrier index in a carrier group.

13. The method according to claim 12, wherein the preset condition further comprises: the uplink transmission is uplink transmission scheduled by the network-side device.

14. The method according to claim 13, wherein the carrier to which the uplink transmission belongs is the same as or different from the carrier to which the uplink data channel belongs.

15. The method according to claim 13, wherein the uplink transmission comprises: aperiodic channel state information A-CSI.

16. The method according to claim 13, wherein the uplink transmission scheduled by the network-side device comprises uplink transmission generated by a terminal based on scheduling message sent by the network-side device.

17. The method according to claim 12, wherein the uplink transmission further comprises:

uplink transmission generated on a carrier with the smallest carrier index among a plurality of carriers in a case that the plurality of carriers are configured with configured grants; or uplink transmission generated on a target configured grant of one carrier in a case that the one carrier is configured with a plurality of configured grants.

18. The method according to claim 17, wherein the target configured grant comprises a configured grant with the earliest transmission start time of the one carrier.

19. A network-side device, comprising a memory, at least one hardware processor, and instructions stored in the memory and capable of running on the at least one hardware processor, wherein when the instructions are executed by the at least one hardware processor, the network-side device is caused to:

in a case that an uplink control channel conflicts with an uplink data channel, receive uplink control information and uplink transmission, wherein multiplexing transmission is performed for the uplink control information and the uplink transmission via the uplink data channel, wherein a transmission resource of the uplink transmission and a transmission resource of the uplink control channel overlap, and the uplink transmission meets a preset condition wherein the uplink data channel is a dynamic grant, and the preset condition comprises:

a carrier to which the uplink transmission belongs is a carrier, of a terminal, on which an uplink skipping function is prohibited from being enabled or is not configured, wherein the carrier on which the uplink skipping function is prohibited from being enabled or is not configured comprises at least one of the following:

a primary carrier or a carrier with the smallest carrier index in a carrier group.

* * * * *